US 8,825,940 B1

(12) United States Patent
Diggs

(10) Patent No.: US 8,825,940 B1
(45) Date of Patent: Sep. 2, 2014

(54) ARCHITECTURE FOR OPTIMIZING EXECUTION OF STORAGE ACCESS COMMANDS

(75) Inventor: Mark S. Diggs, Laguna Hills, CA (US)

(73) Assignee: SiliconSystems, Inc., Aliso Viejo, CA (US)

( * ) Notice: Subject to any disclaimer, the term of this patent is extended or adjusted under 35 U.S.C. 154(b) by 289 days.

(21) Appl. No.: 12/326,780

(22) Filed: Dec. 2, 2008

(51) Int. Cl.
G06F 12/00 (2006.01)
G06F 13/00 (2006.01)
G06F 13/28 (2006.01)

(52) U.S. Cl.
USPC .......................................................... 711/103

(58) Field of Classification Search
USPC .......................................................... 711/103
See application file for complete search history.

(56) References Cited

U.S. PATENT DOCUMENTS

| | | | |
|---|---|---|---|
| 4,644,494 A * | 2/1987 | Muller | 711/152 |
| 4,937,736 A | 6/1990 | Chang et al. | |
| 5,018,096 A | 5/1991 | Aoyama | |
| 5,640,529 A | 6/1997 | Hasbun | |
| 5,781,783 A | 7/1998 | Gunther et al. | |
| 5,860,137 A * | 1/1999 | Raz et al. | 711/202 |
| 5,929,590 A | 7/1999 | Tang | |
| 6,052,799 A | 4/2000 | Li et al. | |
| 6,134,631 A | 10/2000 | Jennings, III | |
| 6,173,360 B1 | 1/2001 | Beardsley et al. | |
| 6,286,087 B1 | 9/2001 | Ito et al. | |
| 6,324,627 B1 | 11/2001 | Kricheff et al. | |
| 6,484,229 B1 | 11/2002 | Ichikawa et al. | |
| 6,633,963 B1 | 10/2003 | Ellison et al. | |
| 6,640,268 B1 | 10/2003 | Kumar | |
| 6,654,850 B2 * | 11/2003 | Fox et al. | 711/111 |
| 6,694,381 B1 | 2/2004 | Lo et al. | |
| 6,792,519 B2 | 9/2004 | Constable et al. | |
| 6,968,434 B2 | 11/2005 | Kamano et al. | |
| 7,003,644 B2 | 2/2006 | Heath et al. | |
| 7,024,410 B2 | 4/2006 | Ito et al. | |
| 7,114,051 B2 | 9/2006 | Guu et al. | |

(Continued)

FOREIGN PATENT DOCUMENTS

| CN | 1662886 A | 8/2005 |
|---|---|---|
| CN | 1985239 A | 6/2007 |

OTHER PUBLICATIONS

Office Action dated Feb. 28, 2011 from U.S. Appl. No. 12/410,304, 11 pages.

(Continued)

Primary Examiner — Matthew Bradley
Assistant Examiner — Craig Goldschmidt

(57) ABSTRACT

Systems and methods for an architecture for optimizing execution of storage access commands is disclosed. The architecture enables a storage subsystem to execute storage access commands while satisfying one or more optimization criteria. The architecture thereby provides predictable execution times of storage access commands performed on a storage subsystem. In order to optimize execution of storage access commands, in one embodiment the host system sends a calibration request specifying a storage access command and an optimization criterion. In response to the calibration request, the storage subsystem determines the execution speeds of the storage access command within the non-volatile memory storage array and selects at least one region within the non-volatile memory storage array having the execution speed that satisfies the optimization criterion. Subsequently, when the host system desires that a storage access command be executed in satisfaction of the optimization criterion, the storage subsystem executes the command within the selected region.

24 Claims, 13 Drawing Sheets

(56) References Cited

U.S. PATENT DOCUMENTS

| | | | |
|---|---|---|---|
| 7,139,871 | B2 | 11/2006 | Mizuno |
| 7,139,890 | B2 | 11/2006 | Moran et al. |
| 7,149,046 | B1 * | 12/2006 | Coker et al. ............. 360/75 |
| 7,170,788 | B1 | 1/2007 | Wan et al. |
| 7,213,117 | B2 | 5/2007 | Wakabayashi et al. |
| 7,224,604 | B2 | 5/2007 | Lasser |
| 7,287,118 | B2 | 10/2007 | Chang et al. |
| 7,307,881 | B2 | 12/2007 | Chen et al. |
| 7,315,917 | B2 | 1/2008 | Bennett et al. |
| 7,330,954 | B2 | 2/2008 | Nangle |
| 7,408,804 | B2 | 8/2008 | Hemink et al. |
| 7,441,067 | B2 | 10/2008 | Gorobets et al. |
| 7,447,807 | B1 | 11/2008 | Merry et al. |
| 7,450,436 | B2 | 11/2008 | Salessi et al. |
| 7,467,253 | B2 | 12/2008 | Yero |
| 7,509,441 | B1 | 3/2009 | Merry et al. |
| 7,515,471 | B2 | 4/2009 | Oh et al. |
| 7,609,565 | B2 | 10/2009 | Lee |
| 7,654,466 | B2 | 2/2010 | Maeda et al. |
| 7,870,128 | B2 * | 1/2011 | Jensen et al. ............. 707/727 |
| 2002/0073272 | A1 | 6/2002 | Ko et al. |
| 2003/0162549 | A1 | 8/2003 | Carlsson |
| 2003/0163633 | A1 | 8/2003 | Aasheim et al. |
| 2003/0182496 | A1 * | 9/2003 | Yoo ............. 711/103 |
| 2003/0188092 | A1 | 10/2003 | Heath et al. |
| 2003/0200400 | A1 | 10/2003 | Nangle |
| 2004/0015653 | A1 | 1/2004 | Trantham |
| 2005/0160195 | A1 | 7/2005 | Bruner et al. |
| 2005/0196165 | A1 | 9/2005 | Dybsetter et al. |
| 2006/0095699 | A1 | 5/2006 | Kobayashi et al. |
| 2006/0143426 | A1 | 6/2006 | Wu |
| 2006/0184736 | A1 * | 8/2006 | Benhase et al. ............. 711/118 |
| 2006/0190696 | A1 | 8/2006 | Ito et al. |
| 2006/0236392 | A1 | 10/2006 | Thomas et al. |
| 2006/0294338 | A1 | 12/2006 | Fisher et al. |
| 2007/0033362 | A1 | 2/2007 | Sinclair |
| 2007/0050536 | A1 | 3/2007 | Kolokowsky |
| 2007/0079065 | A1 * | 4/2007 | Bonella et al. ............. 711/113 |
| 2007/0079097 | A1 | 4/2007 | Karnowski et al. |
| 2007/0136553 | A1 * | 6/2007 | Sinclair ............. 711/203 |
| 2007/0192538 | A1 * | 8/2007 | Dawkins ............. 711/114 |
| 2007/0208604 | A1 | 9/2007 | Purohit et al. |
| 2007/0233939 | A1 | 10/2007 | Kim |
| 2007/0245065 | A1 | 10/2007 | Kagan et al. |
| 2007/0247933 | A1 | 10/2007 | Kagan |
| 2008/0019189 | A1 | 1/2008 | Lin |
| 2008/0019196 | A1 | 1/2008 | Lin |
| 2008/0082726 | A1 | 4/2008 | Elhamias |
| 2008/0091872 | A1 | 4/2008 | Bennett et al. |
| 2008/0098164 | A1 * | 4/2008 | Lee et al. ............. 711/103 |
| 2008/0126449 | A1 | 5/2008 | Haitsma |
| 2008/0162798 | A1 | 7/2008 | Lofgren et al. |
| 2008/0270678 | A1 | 10/2008 | Cornwell et al. |
| 2008/0282024 | A1 | 11/2008 | Biswas et al. |
| 2008/0294813 | A1 * | 11/2008 | Gorobets ............. 710/62 |
| 2009/0089492 | A1 | 4/2009 | Yoon et al. |
| 2009/0125782 | A1 * | 5/2009 | Josefiak et al. ............. 714/758 |
| 2009/0138654 | A1 | 5/2009 | Sutardja |
| 2009/0150599 | A1 * | 6/2009 | Bennett ............. 711/103 |
| 2009/0172213 | A1 | 7/2009 | Jayachandran et al. |
| 2009/0204853 | A1 | 8/2009 | Diggs et al. |
| 2010/0061152 | A1 | 3/2010 | De Caro et al. |
| 2011/0191526 | A1 | 8/2011 | Haukness et al. |

OTHER PUBLICATIONS

Office Action dated Apr. 4, 2008 received in related U.S. Appl. No. 11/480,276.
Office Action dated Jun. 30, 2008 received in related U.S. Appl. No. 11/480,303.
Office Action dated Apr. 7, 2011 from U.S. Appl. No. 12/350,180, 22 pages.
Micron Technical Note, "NAND Flash 101: An Introduction to NAND Flash and How to Design It in to Your Next Product", TN-29-19, Nov. 2006, http://download.micron.com/pdf/technotes/nand/tn2919.pdf, pp. 1-28.
Office Action dated Nov. 16, 2010 from U.S. Appl. No. 12/410,304, 22 pages.
Office Action dated Oct. 12, 2011 from U.S. Appl. No. 12/350,180, 22 pages.
Notice of Panel Decision dated Aug. 18, 2011 from U.S. Appl. No. 12/410,304, 2 pages.
Office Action dated Jun. 3, 2011 from U.S. Appl. No. 12/410,304, 4 pages.
Brief on Appeal submitted on Sep. 19, 2011 in U.S. Appl. No. 12/410,304 in 14 pages.
Examiner's Answer mailed on Oct. 7, 2011 received in U.S. Appl. No. 12/410,304 in 14 pages.
Office Action dated Oct. 12, 2011 from U.S. Appl. No. 12/350,180, 12 pages.
Office Action dated Jun. 1, 2012 for U.S. Appl. No. 12/350,180, 14 pages.
Office Action dated Nov. 5, 2012 from U.S. Appl. No. 12/350,180, 11 pages.
Office Action dated Oct. 8, 2013 from Chinese Patent Application No. 201010134420.0, filed Mar. 16, 2010, 16 pages.
Office Action dated Jan. 30, 2014 from U.S. Appl. No. 12/350,180, 20 pages.

* cited by examiner

ARCHITECTURE FOR OPTIMIZING EXECUTION OF STORAGE ACCESS COMMANDS

BACKGROUND

1. Technical Field

The present invention relates to storage subsystems, and more specifically, to systems and methods for optimizing execution of storage access commands.

2. Description of the Related Art

Solid-state storage subsystems are widely used to store various types of data. They are often used as an alternative to disk-based storage, particularly in portable electronic devices that often require a combination of large memory capacity and portability. One limitation of solid-state storage subsystems is the need to perform block erase operations when storing data within (programming) the non-volatile memory ("NVM") array. Another limitation is the finite number of write-erase cycles associated with non-volatile memory storage arrays, whose non-volatile storage components can lose the ability to retain data stored thereon after as little as hundreds of thousands or millions of write/erase cycles. This may necessitate performing periodic wear leveling operations to distribute write-erase cycles evenly across memory blocks and/or periodic bad block management operations to identify and mark inoperative memory blocks. Consequently, a significant problem with solid-state storage subsystems is that their programming performance depends on whether block erase, wear leveling, and bad block management operations need to be performed in advance of programming the memory blocks. The resulting programming performance variance can be especially problematic when a storage subsystem is used for time-critical tasks such as backing up data during a power failure or brownout, caching data, programming data sets having a high priority, or executing time-critical non-standard storage access commands.

SUMMARY

Systems and methods for an architecture for optimizing execution of storage access commands are disclosed. The architecture enables a storage subsystem to execute storage access commands while satisfying one or more optimization criteria. The architecture thereby provides predictable execution times of storage access commands performed on a storage subsystem. In order to optimize execution of storage access commands, in one embodiment the host system sends a calibration request specifying a storage access command and an optimization criterion. In response to the calibration request, the storage subsystem determines the execution speeds of the storage access command within the non-volatile memory storage array and selects at least one region within the non-volatile memory storage array having the execution speed that satisfies the optimization criterion. Subsequently, when the host system desires that a storage access command be executed in satisfaction of the optimization criterion, the storage subsystem executes the command within the selected region.

BRIEF DESCRIPTION OF THE DRAWINGS

Preferred embodiments of the invention will now be described with reference to the drawings summarized below. These drawings and the associated description are provided to illustrate preferred embodiments of the invention, and not to limit the scope of the invention.

DETAILED DESCRIPTION OF PREFERRED EMBODIMENTS

Systems and methods for optimizing execution of storage access commands will now be described with reference to the drawings. Where possible, the same reference numbers are used throughout the drawings to refer to the same or like components. The present description is intended to illustrate certain preferred embodiments, but other embodiments that are apparent to those of ordinary skill in the art, including embodiments which do not provide all of the benefits and features set forth herein, are also within the scope of this invention. As one example, some embodiments may omit some or all of the data backup features described herein. Thus, nothing in this detailed description is intended to suggest that any particular feature or component is essential. The invention is defined by the claims.

1. Existing Approaches of Using a Storage Subsystem

This section describes a typical environment in which the various inventive features may be employed, and describes some of the significant problems with existing approaches of programming non-volatile memory arrays.

Figure 1:
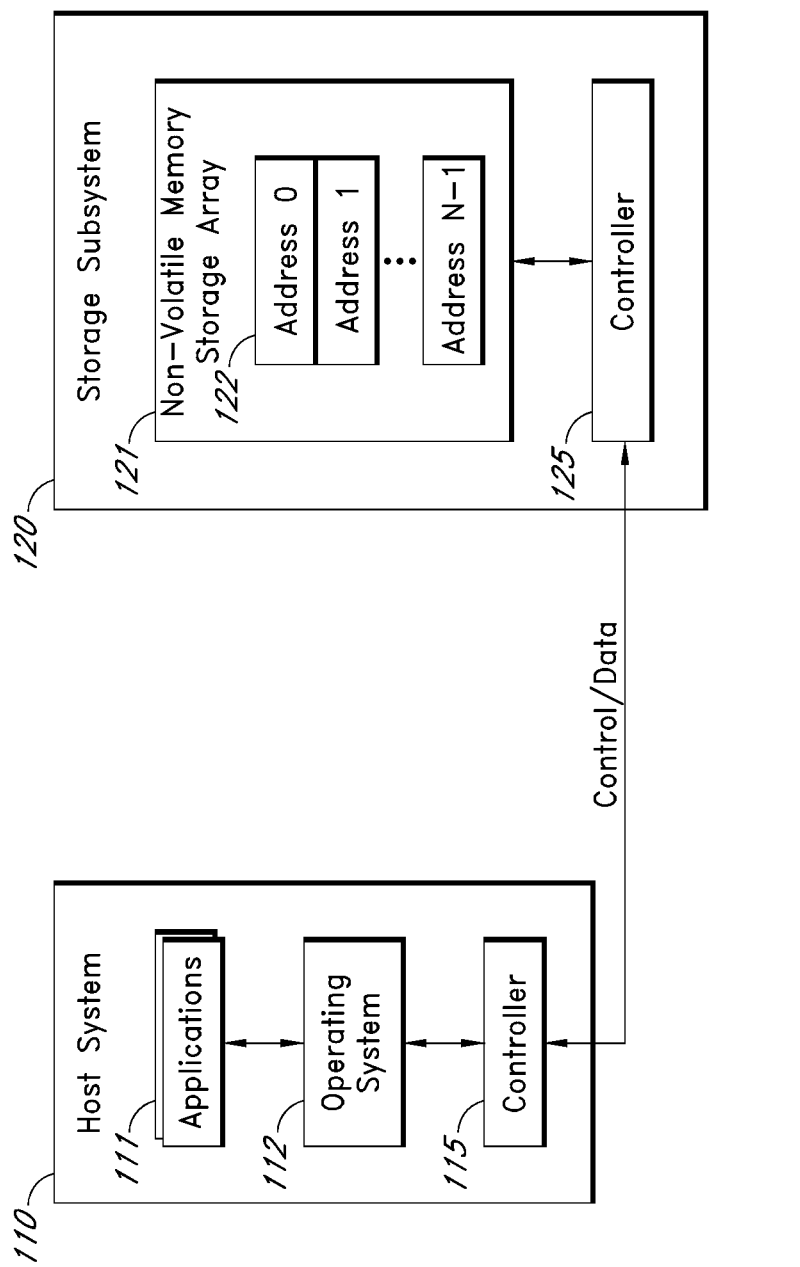
FIG. 1 is a block diagram showing how a storage subsystem may interface with a host system.
Figure 2:
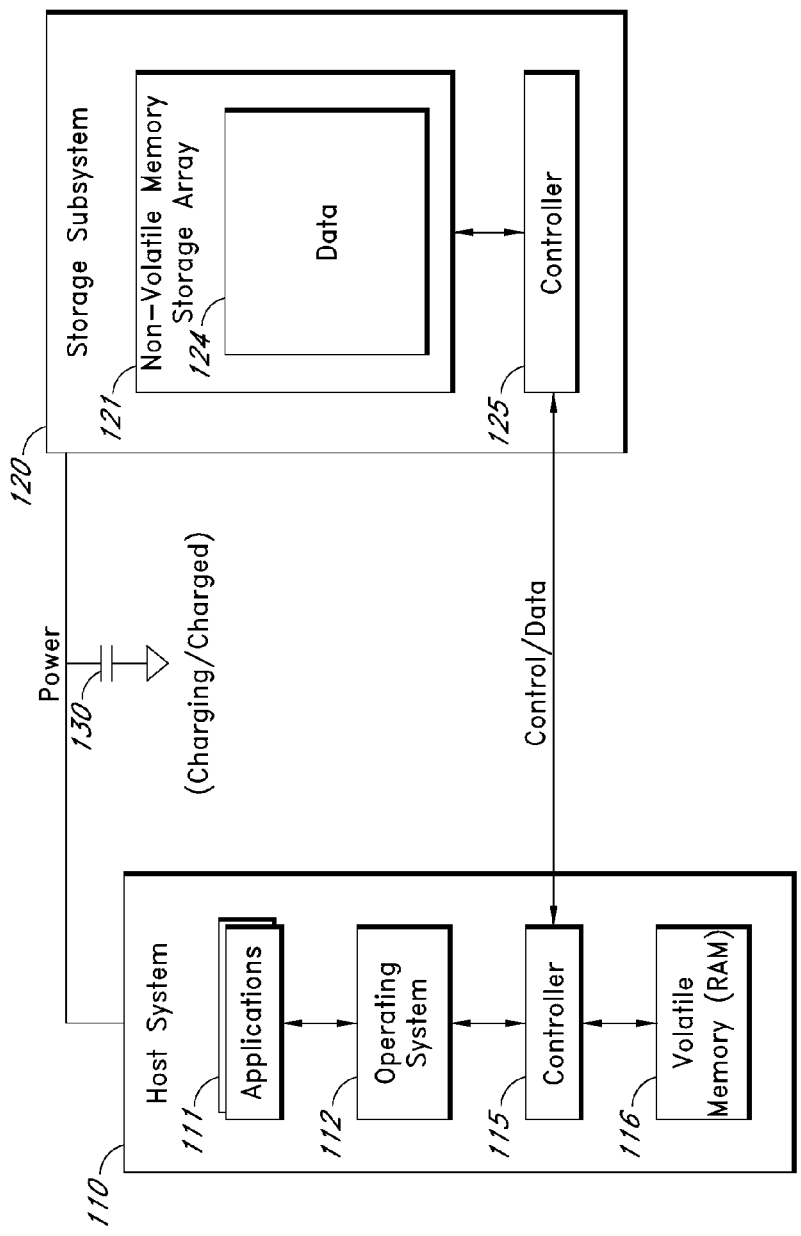
FIG. 2 is a block diagram showing how the system of FIG. 1 operates under normal conditions.
Figure 3:
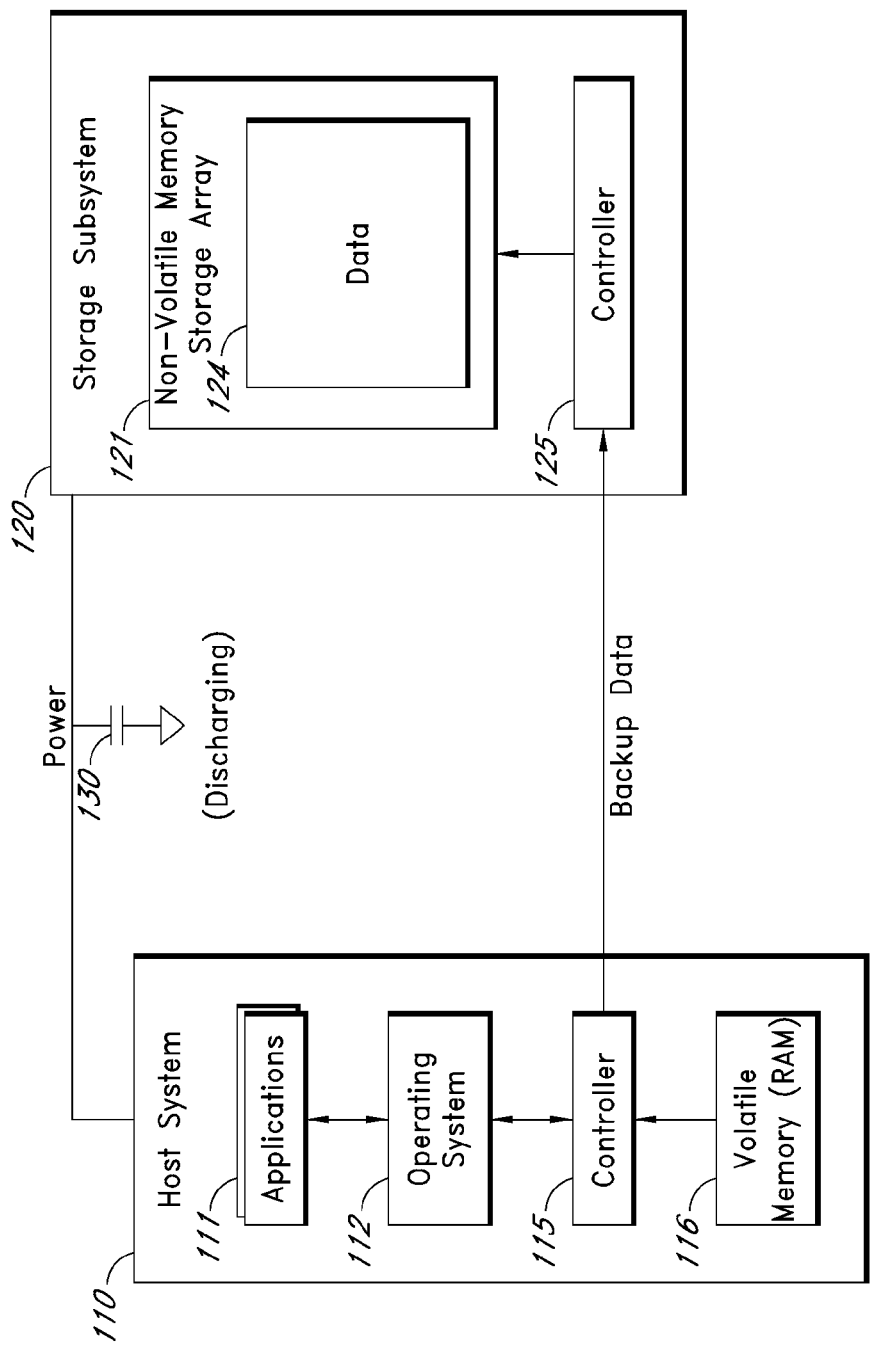
FIG. 3 is a block diagram showing how the data may be backed up during a power loss condition.

FIGS. 1-3 are block diagrams showing a host system 110 connected to a storage subsystem 120. The host system 110 executes applications 111 that may store and retrieve data from the storage subsystem 120. The host system 110 executes an operating system program ("OS") 112 that provides functionality for communicating with the storage subsystem 120 by issuing commands to a controller 115.

The storage subsystem 120 comprises a controller 125 and a storage subsystem non-volatile memory storage array 121. The non-volatile memory storage array 121 is arranged in memory address locations 122. As is conventional, the controller 125 is configured to write data and read data from the non-volatile memory storage array 121 in response to receiving storage access commands from the host system 110. The controller 125 preferably implements a wear leveling algorithm, as is known in the art, to distribute write operations across memory blocks of the non-volatile memory storage array and a bad block management algorithm to recognize and mark inoperative memory blocks of the non-volatile memory storage array. The storage subsystem may receive its power from the host system.

FIG. 2 shows a host system 110 using a storage subsystem 120 during a normal storage and retrieval operation. For example, the host system 110 may use the storage subsystem 120 for recording day-to-day operations of an industrial control unit. Because the non-volatile memory storage array 121 retains stored data during a power loss, it is advantageous for the host system to periodically transfer the recorded data from the volatile memory 116 to the storage subsystem. Transferred data 124 is stored within the non-volatile memory storage array 121.

If a sudden power loss condition arises, critical data stored in the volatile memory 116 of the host system can be backed up to the storage subsystem 120 for later retrieval. To provide power for the backup operation, the host system 110 may implement hardware that comprises a capacitor 130 that charges up when the host system operates normally, as in FIG. 2, and discharges when power is lost, as in FIG. 3. The capacitor 130 is designed to have enough capacitance to hold power to the host system 110 and the storage subsystem 120 so that all of critical data can be stored within the non-volatile memory storage array 121 before power is lost. Consequently, in order to design hardware to provide power during a power loss, it becomes desirable to know the worst case time (i.e., longest time) needed to backup all of critical data.

2. Performance of Existing Storage Subsystems

According to the datasheets of major non-volatile memory storage array manufacturers, a conventional single-level cell non-volatile memory storage array has a typical programming operation time of 200-220 μs (per 2 KB page), a typical block erase operation time of 1.5 ms (per 128 KB block comprising 64 program pages), and a typical wear leveling operation time of 14.3 ms (estimated to comprise one block move and one block erase operation). However, the maximum programming operation time is 500-750 μs, the maximum block erase operation time is 2 ms, and the maximum wear leveling operation time is 50 ms.

Figure 4A:
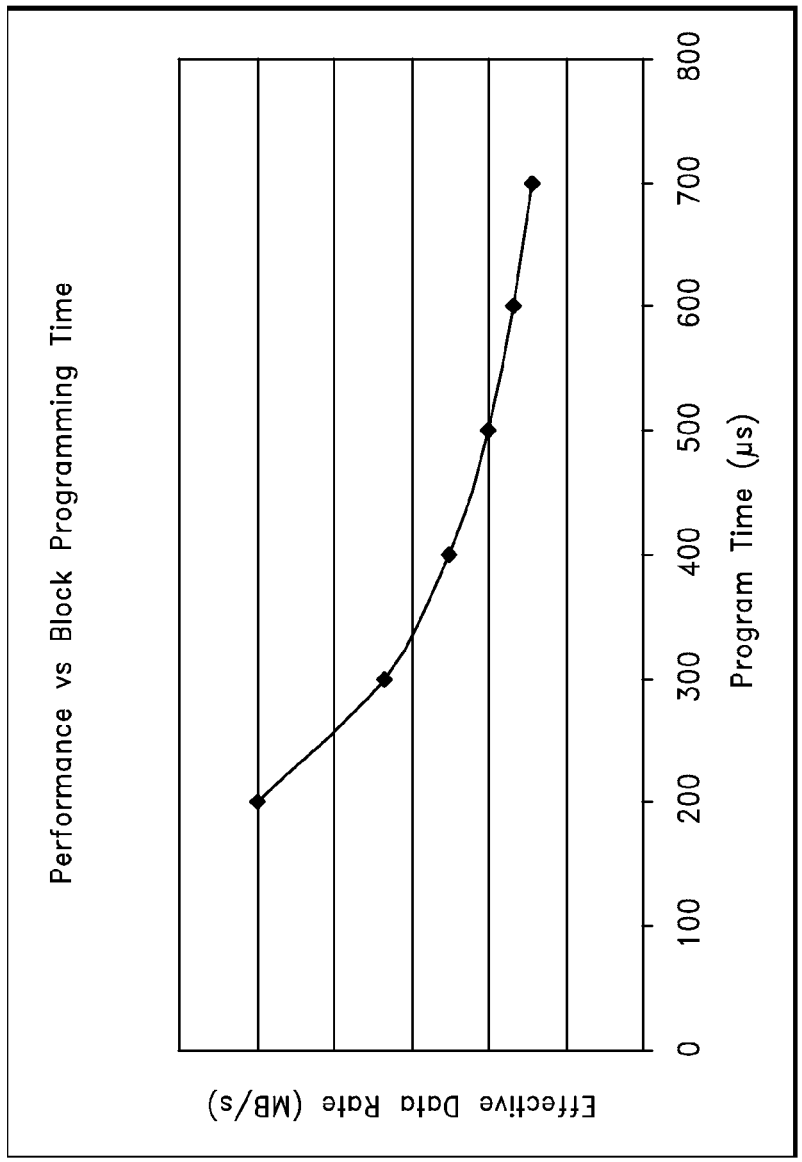
FIGS. 4A-4C are graphs illustrating effective performance of a storage subsystem versus block programming time, block erase operations, and wear leveling operations.
Figure 4B:
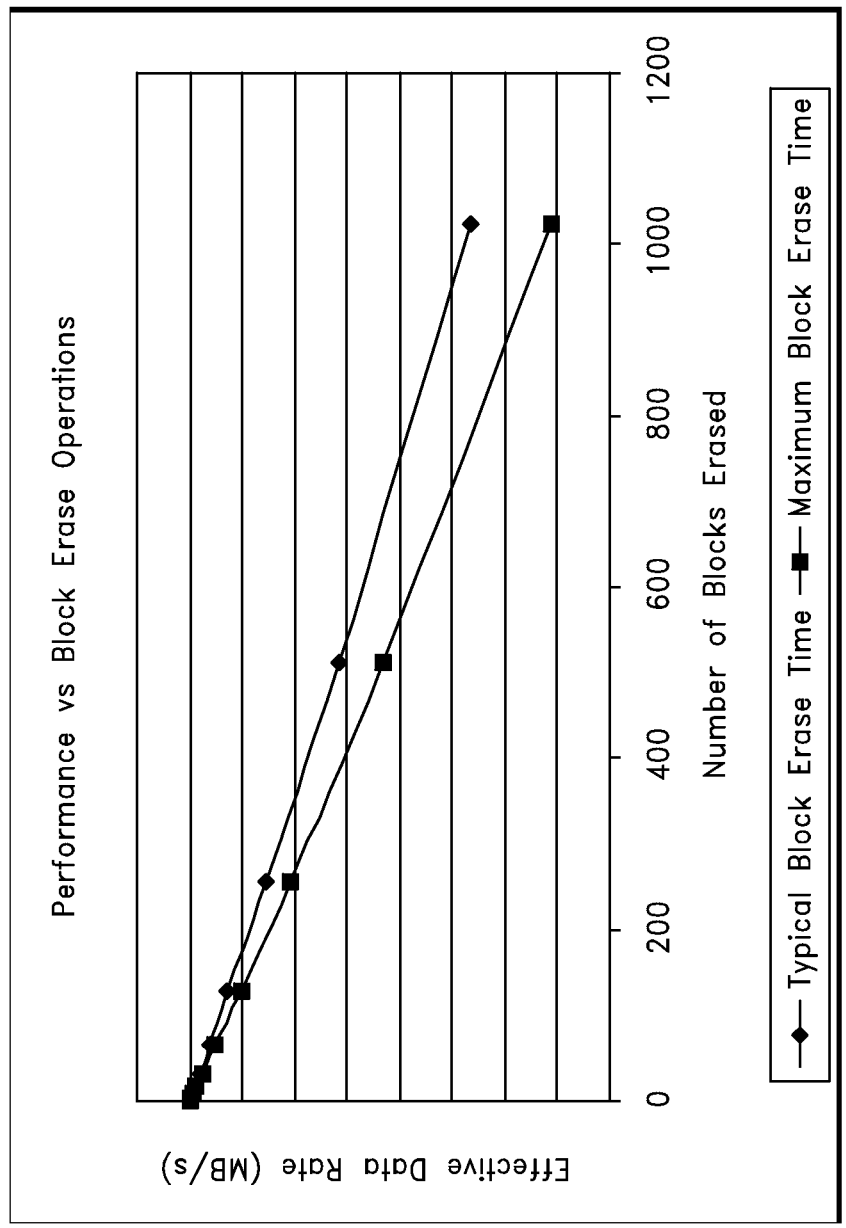
Figure 4C:
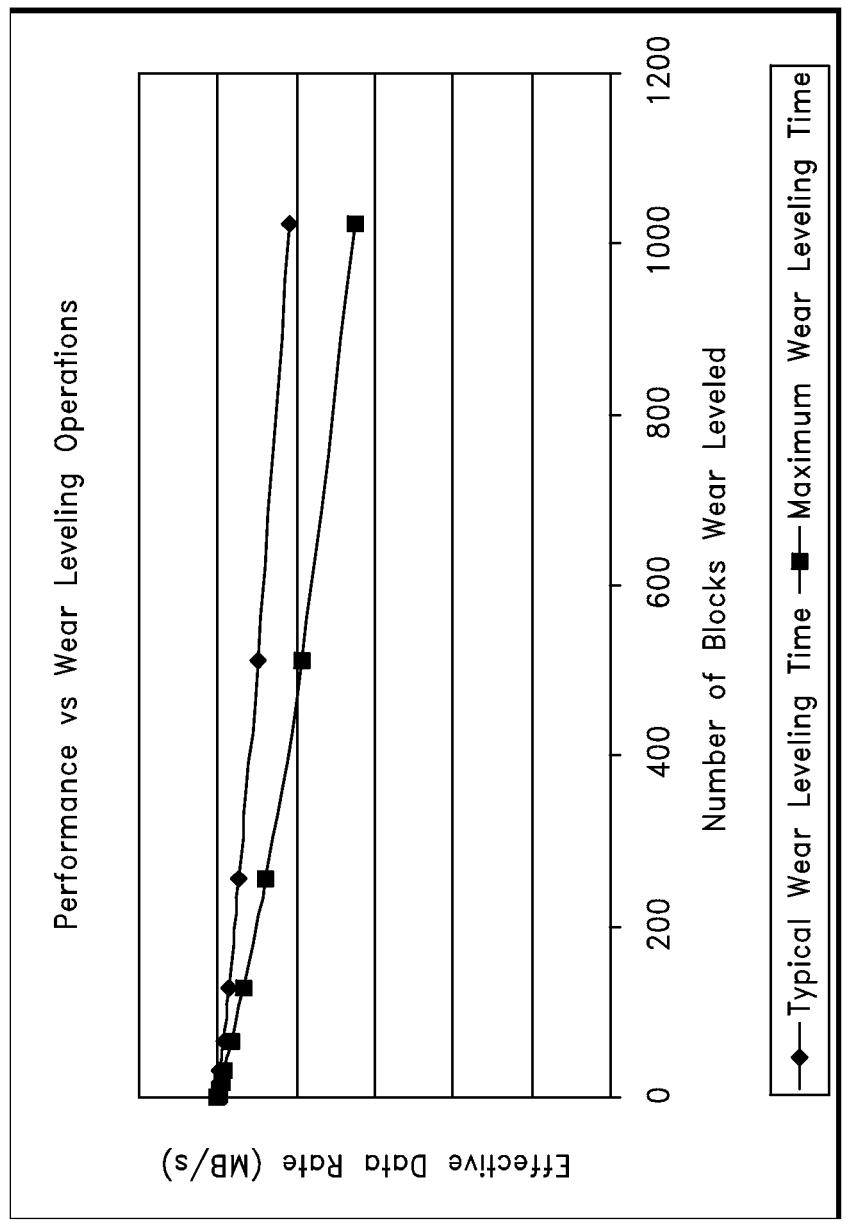

Under ideal conditions, no block erase or wear leveling operations need to be performed prior to a programming operation. Hence, the ideal data rate corresponding to 200 μs programming operation time is 10 MB/sec. However, when the programming operation time is greater than the typical and block erase or wear leveling operations are needed, conditions become non-ideal. As illustrated in FIGS. 4A-4C, the data rate is inversely proportional to the programming operation time, number of block erase operations, and number of wear leveling operations. Any one of these variables or their combination can severely affect the data rate of the storage subsystem.

For example, under ideal conditions 128 MB of data can be stored within a storage subsystem in 12.8 seconds (128 MB÷10 MB/sec). But, with only a change in the programming operation time from 200 μs to 750 μs, storing 128 MB of data would take at least 48 seconds. In addition, if wear leveling operations need to be performed on just 10% of the blocks (and assuming 128 KB block size), storing 128 MB of data would take at least 53 seconds.

Such a long delay can be become prohibitively costly when time-critical tasks need to be performed. For example, when power is lost and 128 MB of data needs to be backed up from the volatile memory 116 to the storage subsystem 120, the capacitor 130 needs to be large and expensive (as capacitance is linear to the cost and the size of a capacitor) in order to provide such large "hold" times for backing up data.

3. Architecture for Optimizing Execution of Storage Access Commands

An architecture will now be described that addresses at least some of the above problems by selecting areas of the non-volatile memory storage array where the execution speeds of storage access commands satisfy one or more optimization criteria and, optionally, minimizing overhead operations (for example, block erase, wear leveling, and bad block management operations) in those areas. A host system can use such areas when it desires optimized execution of storage access commands by a storage subsystem. The architecture may be used with any of a variety of different standard storage interfaces and protocols, including but not limited to ATA, SATA, SCSI, USB, RS232/423, PCMCIA, FIREWIRE, FibreChannel, PCI EXPRESS bus, SD, MMC, or MMC Plus.

Figure 5:
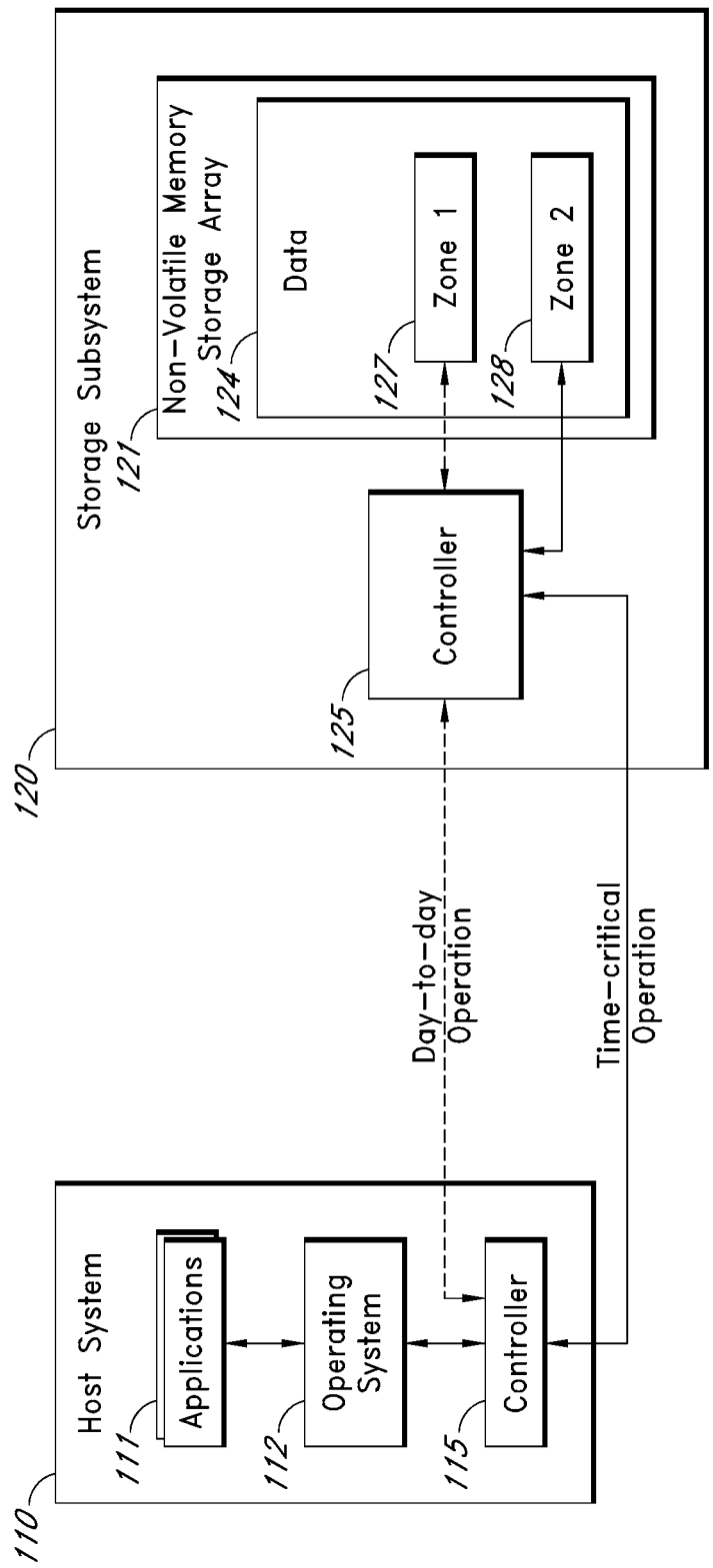
FIG. 5 is a block diagram showing how a storage subsystem may interface with a host system according to an embodiment of the invention.

FIG. 5 is a block diagram showing a host system 110 connected to a storage subsystem 120 according to an embodiment of the invention. The host system 110 comprises a computer such as a personal computer, workstation, router, blade server, personal data assistant, or other type of computing device. For example, the host system may be a military system, a flight computer or other flight avionics system, a wearable computer used for military applications, a high-speed data recorder, a medical device, an industrial control system, an interactive kiosk, a personal data assistant, a laptop computer, an interactive wireless communication device, a point-of-sale device, or the like. The host system executes applications 111 that may store and retrieve data from the storage subsystem 120. The host system 110 executes an operating system program ("OS") 112 that provides functionality for communicating with the storage subsystem 120 by issuing commands to a controller 115. The controller 115 communicates with the storage subsystem 120 in accordance with a specific storage interface and protocol, including but not limited to ATA, SATA, SCSI, USB, RS232/423, PCMCIA, FIREWIRE, Fibre Channel, PCI EXPRESS bus, SD, MMC, or MMC Plus.

The storage subsystem 120 comprises a controller 125 and a storage subsystem non-volatile memory storage array 121. The non-volatile memory storage array 121 may consist of solid-state non-volatile memory devices, such as flash memory devices. Other types of memory elements, such as solid-state volatile RAM devices and magnetic disk drives, may additionally or alternatively be used. The non-volatile memory storage array 121 comprises memory address locations, which may be arranged into bytes, words, pages, blocks, sectors, clusters, files, directories, partitions, or the like according to a particular storage file system, including but not limited to FAT, FAT32, NTFS, HFS, HFS+, ext, ext2, ext3, ext4, exFAT, JFFS, JFFS2, LogFS, or YAFFS. The controller 125 is configured execute storage access commands communicated from the host system 110 within the non-volatile memory storage array 121.

The storage subsystem 120 can have one or more areas, or regions, within the non-volatile memory storage array 121 that provide an optimized execution of storage access commands. Relatively high performance regions typically exist naturally in a non-volatile memory storage array. They can be found and further calibrated to execute storage access commands with ideal or nearly ideal speed. In one embodiment, a high performance (optimized) region is selected by the storage subsystem 120 in response to a calibration request received from the host system 110. The calibration request specifies a storage access command and an optimization criterion, such that the execution of the storage access command is optimized according to the optimization criterion. In response to the calibration request, the controller 125 performs calibration (finds a high performance region) of the non-volatile memory storage array 121 by executing the specified storage access commands within areas of the non-volatile memory storage array 121 and recording the execution speeds. An area having the execution speed satisfying the optimization criterion is selected as the optimized region.

In a preferred embodiment, the storage access command whose execution is optimized is programming and the optimization criterion is the fastest programming time. As a result, in response to a calibration request from the host system 110, the controller 125 performs calibration of the non-volatile memory storage array 121 by executing programming operations within areas of the non-volatile memory storage array 121 and recording the programming times. An area with the fastest programming time (which may be calculated as an average over multiple operations and/or sub-regions) is selected as the optimized region.

Figure 7:
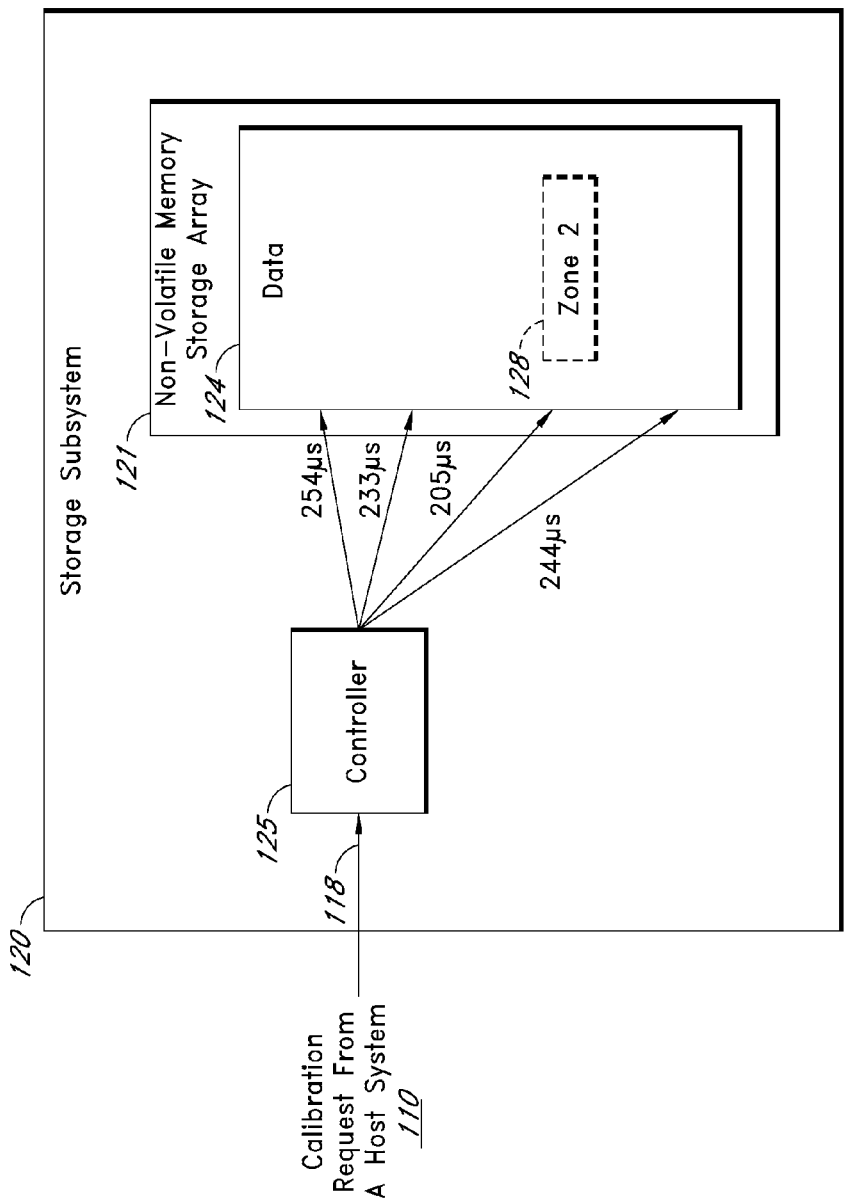
FIG. 7 shows how a host system may calibrate a storage subsystem according to an embodiment of the invention.

FIG. 7 illustrates the selection of an optimized region in accordance with one embodiment. In response to receiving a calibration request 118 from a host system 110, the storage subsystem 120 performs programming operations within the entire non-volatile memory storage array 121 or random areas within the non-volatile memory storage array 121 and records the execution times in order to select the location of the optimized region. In one embodiment, the optimization criterion is the fastest programming time. As shown in FIG. 7, the controller 125 has determined the execution speeds of programming operations in random areas within the non-volatile memory storage array 121 and has selected Zone 2 (128), having the fastest programming time, as the location of the optimized region. In one embodiment, the size of the optimized region should be large enough to accommodate the anticipated size of a data set that will be programmed within it. For example, the non-volatile memory storage array 121 may comprise multiple 512-byte sectors that are programmed as a unit, and the optimized region may include one or more such sectors.

The selected region can be further optimized by performing block erase operations in advance of the host system's desire to use the region, such that block erase operations will not need to be performed when, for example, a programming operation is performed within the region. To further optimize programming performance within the selected region, wear leveling and bad block management operations can be performed in advance or turned off for the region. In addition, any other overhead operations can be similarly performed in advance or disabled in the selected region. For example, during calibration the region can be selected as a contiguous non-volatile memory storage array area to eliminate address computation delays during subsequent programming operations. Consequently, by disabling or performing in advance the overhead operations, the selected region can provide optimized performance of storage access commands.

In one embodiment, calibration can be performed by the host system 110. For example, the host system may communicate a series of storage access commands to areas within the non-volatile memory storage array 121, record the speed of execution of the commands, and select as the location of the optimized region an area within the non-volatile memory storage array 121 having the speed of execution that satisfies the desired optimization criterion. For example, the communicated storage access commands can be programming operations, and the desired optimization criterion can be the fastest programming time. In this embodiment, the calibration request 118 becomes a series of storage access commands, and the optimization criterion is not a part of the calibration request (as the host system selects the optimized region's location according to the optimization criterion).

In another embodiment, execution speeds or averaged, median, or the like execution speeds of the storage access commands whose execution has been optimized within the selected region can be returned to the host system 110. For example, this information can be embedded in the response of the calibration command communicated to the storage subsystem 120. When calibration is performed by the host system 110, the host system can record the execution speeds. The returned execution speeds or averaged, median, or the like execution speeds can be used by the host system as additional information to consider when planning how to perform time-critical tasks such as backing up data during a power failure or brownout, caching data, programming data sets having a high priority, or executing time-critical non-standard storage access commands.

When the host system 110 desires to use the selected region for optimized execution of standard or non-standard storage access commands, the host embeds an identification of the selected region within the storage access command communicated to the storage subsystem 120. In one embodiment in response to a calibration request 118, the host system receives an identification of the selected region, for example, embedded in the response of the calibration request. Then, the host system 110 can embed the received identification of the region within the storage access command, thus specifying to the storage subsystem that the command is to be executed within the selected region. For example, as further explained below, the identification can be a location (a memory address) within the selected region, a special pattern within the structure of the storage access command, an explicit or implicit parameter of a non-standard storage access command, or the like.

In one embodiment, the identification of the selected region can be a special pattern embedded (for example in the data portion) within the storage access command communicated by the host system 110 to the storage subsystem 120. Such a pattern can be known a priori by the host system. Alternatively, such a pattern can be communicated to the host system by the storage subsystem in response to the calibration request, in response to a standard read command, in response to a non-standard storage access command, or the like. The pattern can be embedded into the command portion or data portion of the storage access command communicated to the storage subsystem 120. The controller 125 would then parse the command, discover the embedded pattern, and execute the command within the selected region. Otherwise, if the embedded pattern is not discovered, the controller 125 would execute the command within non-optimized areas of the non-volatile memory storage array 121.

In another embodiment, multiple segments (zones) are defined within the non-volatile memory storage array 121. A zoning mechanism for a storage subsystem is fully described in co-pending U.S. patent applications No. 11/480,303 filed Jun. 30, 2006 and No. 11/480,276 filed Jun. 30, 2006, and is hereby fully incorporated by reference. As a brief summary, zones are created according to zone definitions, which comprise starting and ending memory address of the non-volatile memory storage array 121. At least one zone would correspond to a selected region and at least one other zone would correspond to areas within the non-volatile memory storage array where execution of storage access commands has not been optimized. FIG. 5 shows a non-volatile memory storage array 121 comprising two zones. The host system 110 uses Zone 1 (127) as ordinary memory space for performing dayto-day operations, and data is routinely programmed and read from it. The host system 110 uses Zone 2 (128), a region where execution of storage access commands has been optimized, for performing time-critical operations. Hence, when a host system application 111 desires optimized execution of a storage access command, it embeds into the command an identification specifying that the command be executed within Zone 2.

Figure 6:
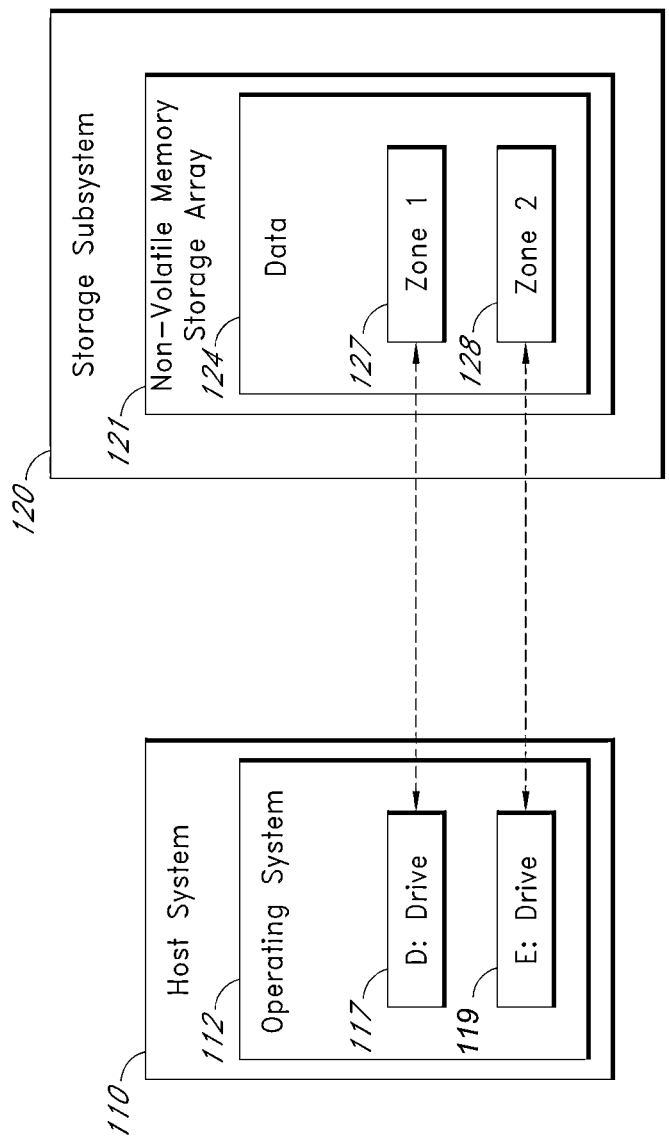
FIG. 6 is a block diagram showing how a storage subsystem may interface with a host system according to another embodiment of the invention.

In one preferred embodiment, a region where execution of storage commands has been optimized can be mapped as a logical drive on the host system 110. FIG. 6 shows an example of how the host system 110 can use such mapping. Zone 1 (127), used by the host system 110 as ordinary memory space for performing day-to-day operations, corresponds to the logical drive "D:" (117). Zone 2 (128), optimized for execution of storage access commands, corresponds to the logical drive "E:" (119). Hence, when a host system application 111 desires optimized execution of a storage access command, it embeds an identification specifying that the command be executed at "virtual" locations within the logical drive "E: (119)." The operating system 112 translates such "virtual" locations into memory addresses within the non-volatile memory storage array 121, and the controller 115 communicates the storage access command to the storage subsystem 120. Subsequently, the controller 125 executes the command within the optimized region.

In another preferred embodiment, a region where execution of storage access commands has been optimized can be mapped as a file on the host system 110. When a host system application 111 desires optimized execution of a storage access command, it writes the command to the mapped file, thereby embedding an identification that the command be executed within the optimized region. The operating system 112 translates this "virtual" location into memory addresses within the optimized region within the non-volatile memory storage array 121, and the controller 115 communicates the storage access command to the storage subsystem 120. Subsequently, the controller 125 executes the command within the optimized region. One benefit of this method is that no special user privileges, such as an "administrator privilege" for Windows or "raw disk" access for Linux, are needed for applications 111 to use the optimized region. Another benefit of this method is that the mapped file may be marked as "read-only," "system," "hidden," or the like to protect the optimized region from unintended or malicious uses.

In another embodiment, a host system application 111 can desire that a non-standard storage access command (not a part of the standard storage interface command set supported by the host system and the storage subsystem) be executed within the selected region. A non-standard storage access command may be embedded within a standard write storage access command and be communicated to the storage subsystem in such manner. A non-standard storage access command may implicitly or explicitly embed an identification of the selected region. For example, when a storage subsystem 120 receives a particular non-standard storage access command (such as Cache Write, Dual Channel Programming, CopyBack, or the like) embedded into a standard write command communicated by the host system 110, the storage subsystem controller 125 may implicitly, based on a priori configuration, execute the command within the selected region. Alternatively, for example, a non-standard storage access command may embed an identification of the selected region in any of the ways explained above, and the storage subsystem controller 125 will execute the command within the selected region.

In another embodiment, execution speeds of storage access commands executed within a selected region can be returned to the host system 110. For example, this information can be embedded in the response of a standard or non-standard storage access command executed within the region. Optionally, execution speeds or averaged, median, or the like execution speeds can be recorded and returned by the storage subsystem 120 periodically (for example, after a certain number of storage access commands have been executed within the selected region) to the host system 110. The returned execution speeds or averaged, median, or the like execution speeds can be used by the host system as additional information to consider when planning how to perform time-critical tasks such as backing up data during a power failure or brownout, caching data, programming data sets having a high priority, or executing time-critical non-standard storage access commands.

A calibration request 118 communicated by the host system 110 to the storage subsystem 120 can comprise single or multiple standard storage access commands in accordance with the specific storage interface and protocol supported by the host system and the storage subsystem. For example, if a region is being calibrated to optimize the execution speed of programming commands, the host system may communicate a series of programming operations to areas within the non-volatile memory storage array 121, record their execution times, and select as the location of the optimized region an area within the non-volatile memory storage array having the speed of execution that satisfies a desired optimization criterion (for example, the fastest programming time).

Alternatively, the calibration request can comprise single or multiple non-standard storage access commands. A non-standard storage access command may specify a storage access command and one or more optimization criteria, such that execution of the storage access command is optimized according to the one or more optimization criteria. Alternatively, a non-standard storage access command may implicitly (for example, by a special command code) communicate to the storage subsystem that a particular storage access command is to be optimized according to an optimization criteria configured a priori. For example, a non-standard storage access command may implicitly communicate programming as the storage access command to be optimized, and the storage subsystem will know that the optimization criterion is the fastest programming time.

The host system 110 may use a standard operating system device driver to communicate calibration requests to the storage subsystem 120 and to communicate storage access commands for execution within the selected region. Alternatively, the host system may use a special (non-standard) operating system device driver, especially where non-standard storage commands are being communicated to the storage subsystem. For reasons of compatibility and portability, it is more advantageous to use a standard operating system device driver.

Consequently, the present architecture enables a storage subsystem to execute storage access commands with predictable and ideal or nearly ideal execution speeds. This can be advantageous for executing time-critical tasks, including but not limited to backing up data during a power failure or brownout, caching data, programming data sets having a high priority, or executing time-critical non-standard storage access commands.

4. An Example of Using Architecture for Optimizing Execution of Storage Access Commands FIGS. 8A-8D are block diagrams showing a host system 110 connected to a storage subsystem 120 having an optimized region 128 in accordance with various embodiments.

For example, the host system 110 may use the storage subsystem 120 for performing normal day-to-day operations, data backup operations during a power failure or brownout, caching data, programming data sets having a high priority, executing time-critical non-standard storage access commands or other time-critical operations. As mentioned above, the host system 110 may implement hardware that comprises a capacitor 130 that supplies power for performing backup operations during a power failure or brownout condition. An optimized region Zone 2 (128) can be used by the host system for programming backup data during a power failure or brownout, caching data, programming data sets having a high priority, executing time-critical non-standard storage access commands or other time-critical operations.

Figure 8A:
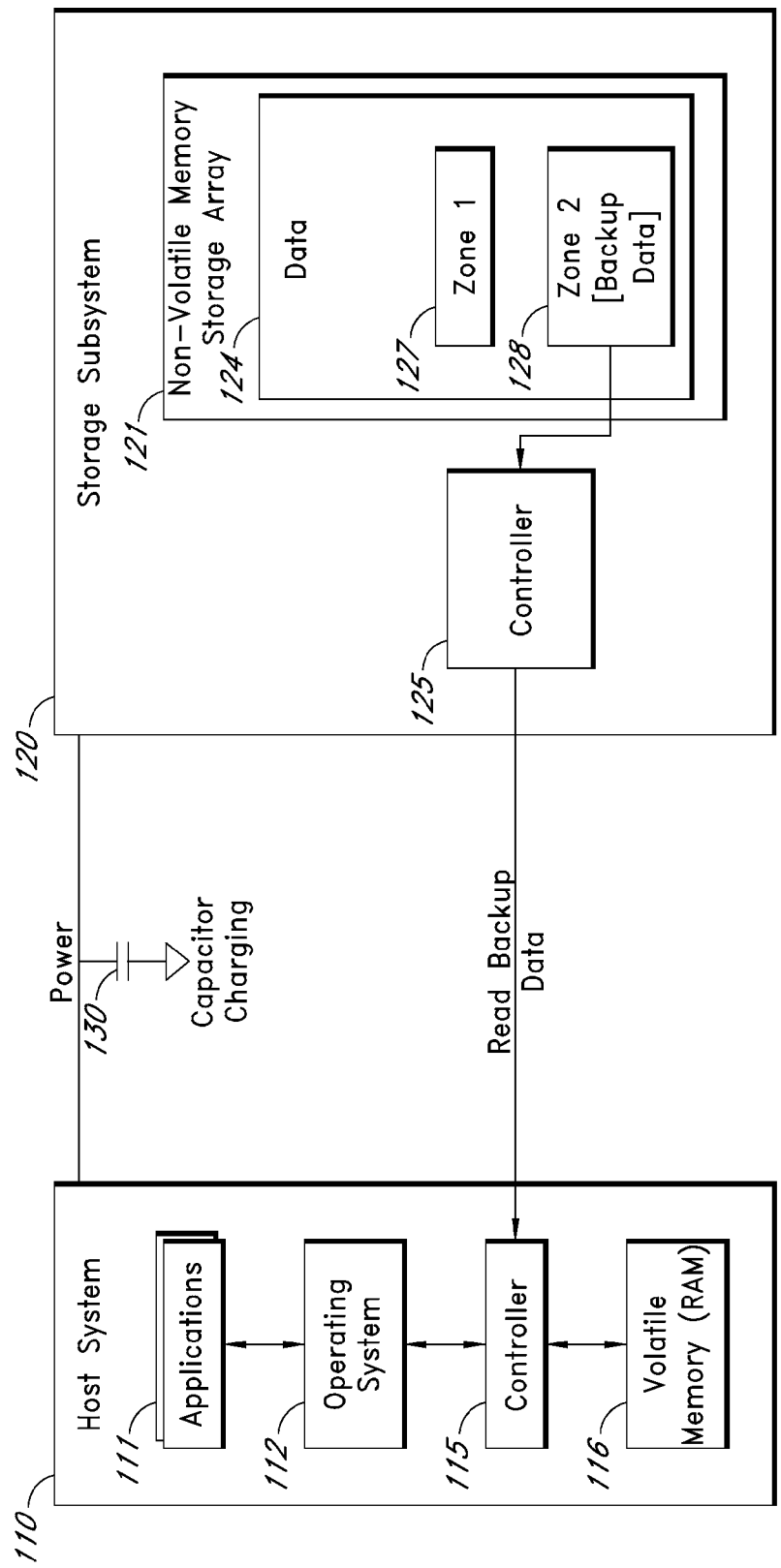
FIG. 8A is a block diagram showing how a host system may use a storage subsystem to read data during a power up operation according to an embodiment of the invention.

FIG. 8A illustrates a power-up operation of the system. When the power is turned on, the host system 110 boots up and checks the storage subsystem 120 for stored backup data. If no backup data is stored within the optimized region 128, the host system 110 proceeds with its power-up operations. Otherwise, the host system retrieves backup data from the optimized region and stores it in the volatile memory 116. Capacitor 130 starts to charge up when power is turned on.

Figure 8B:
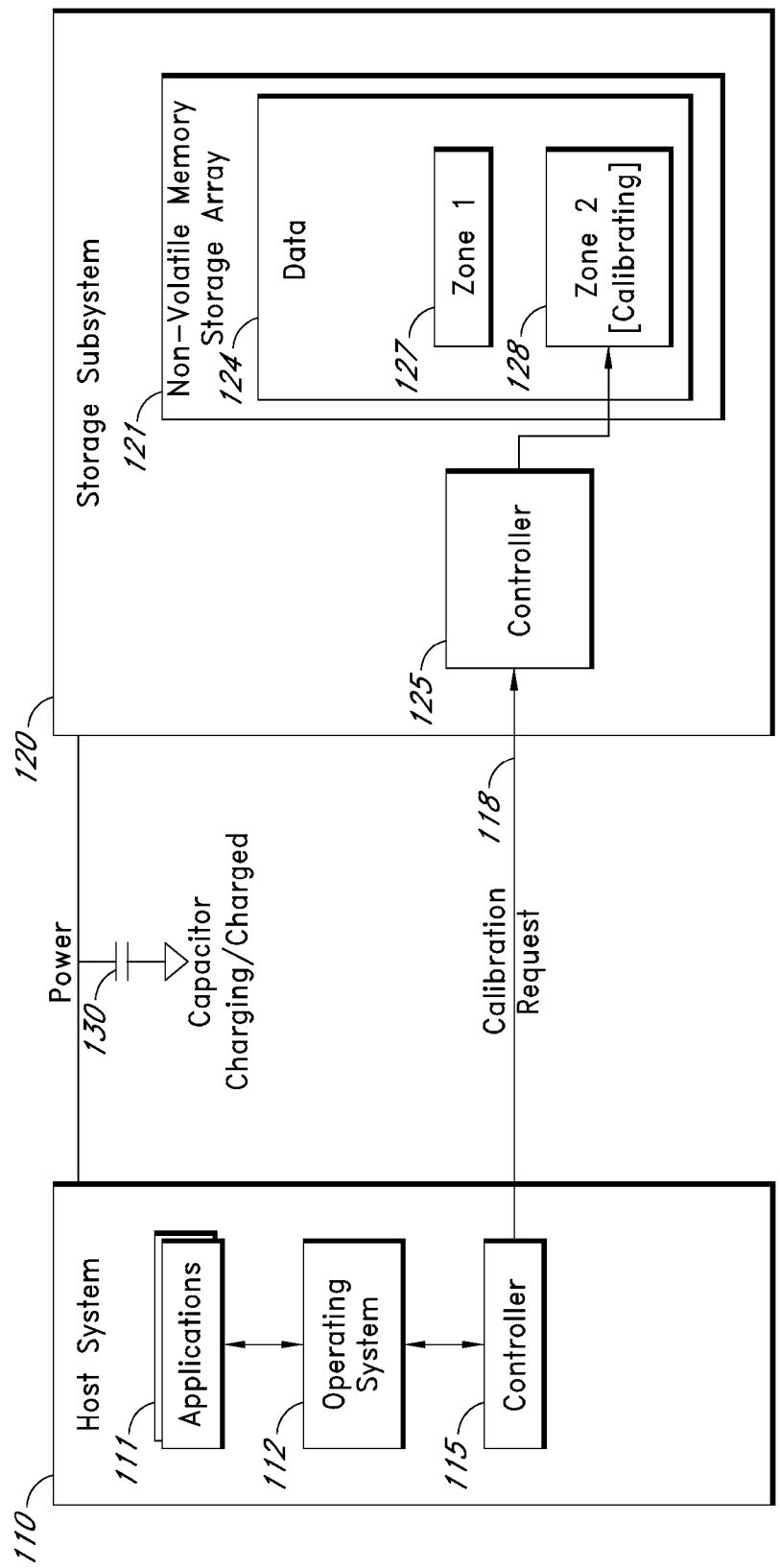
FIG. 8B illustrates how a host system may calibrate a storage subsystem following a power up according to an embodiment of the invention.

When the host system 110 has retrieved backup data stored in the optimized region 128 (or has determined that none is stored), the host system prepares the optimized region for a future time-critical operation (for example, programming of backup data). As shown in FIG. 8B, the host system 110 may send a calibration request 118, for example, specifying programming as the storage access command to be optimized and the fastest programming time as the optimization criterion. The calibration request may be processed by the storage subsystem 120 according to FIG. 7 and the explanation above. To briefly summarize, the location of the optimized region 128 will be determined and its programming operation execution speed will be optimized.

Figure 8C:
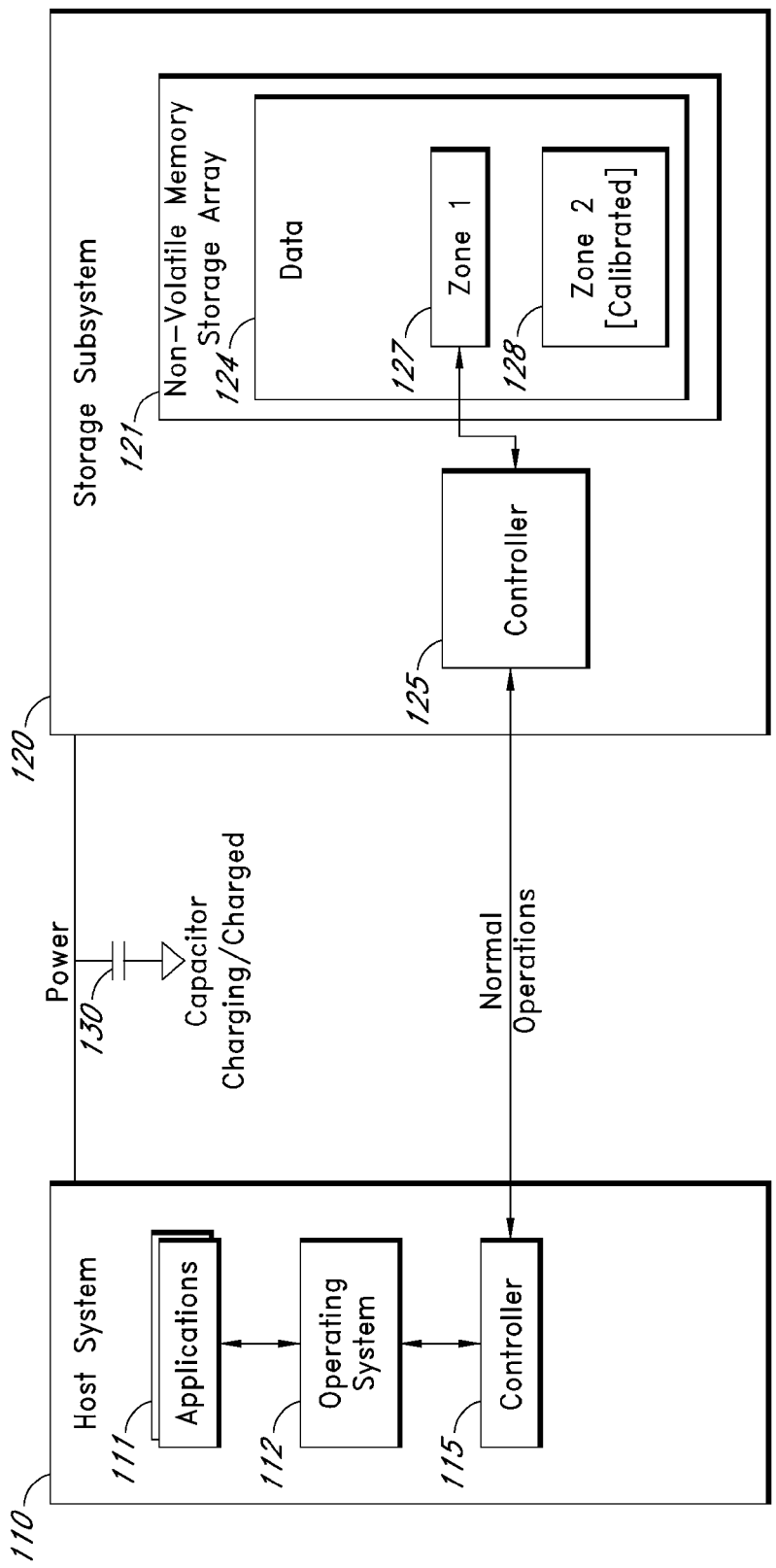
FIG. 8C is a block diagram showing how a host system may use a storage subsystem under normal conditions according to an embodiment of the invention.

FIG. 8C illustrates how the host system 110 uses the storage subsystem 120 for performing normal day-to-day operations. Specifically, the optimized region 128 is not being used during normal operations. Instead, other zones within the non-volatile memory storage array 121 are being used for day-to-day storage and retrieval of data. For example, Zone 1 (127) may be used for performing day-to-day operations, as is shown in FIG. 8C.

Figure 8D:
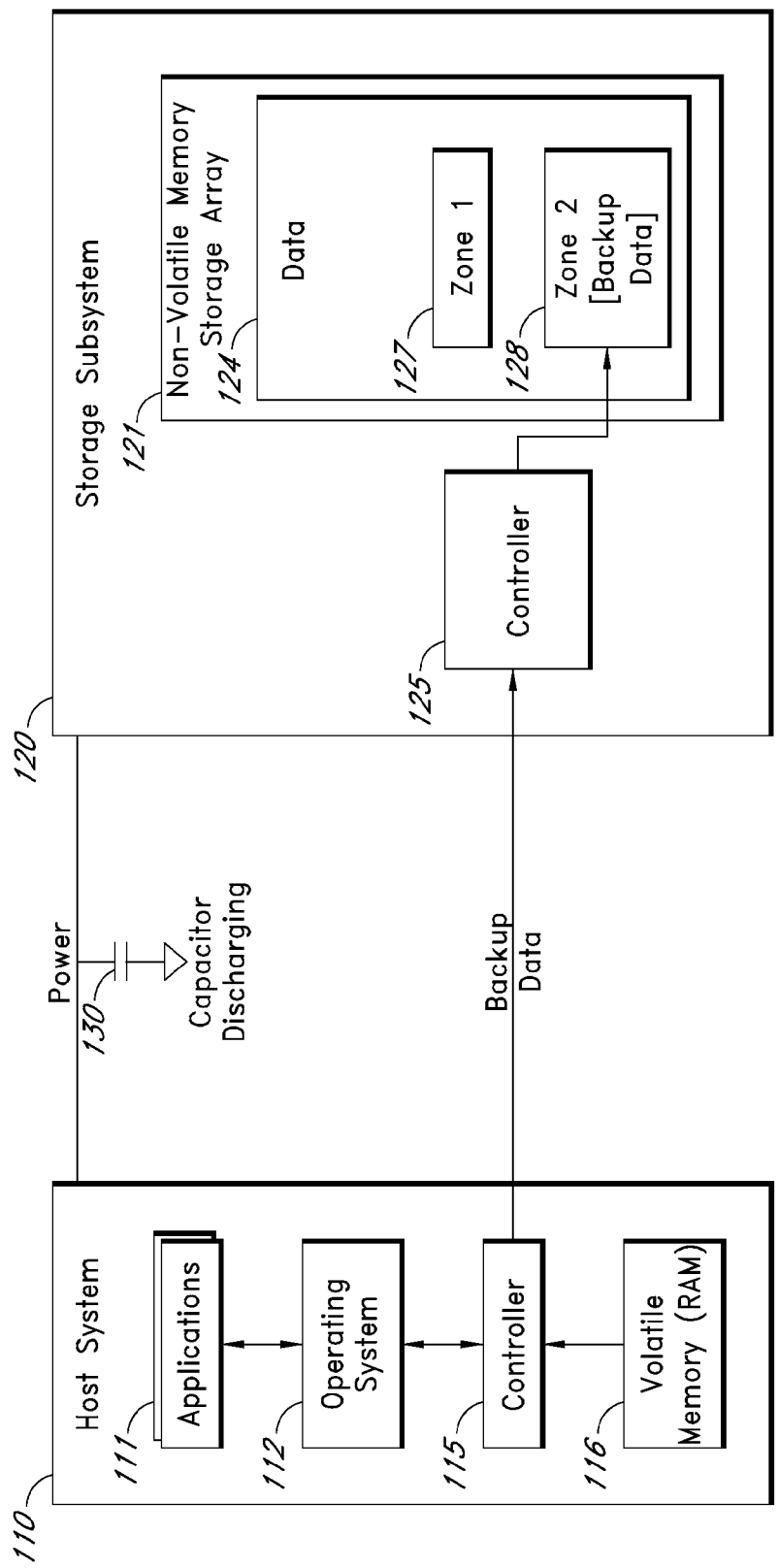
FIG. 8D is a block diagram illustrating how a host system may use a storage subsystem to backup data during a power loss operation according to an embodiment of the invention.

FIG. 8D illustrates operations of the system during a power loss or brownout condition. The capacitor 130 maintains power for performing backup operations. The optimized region 128 has already been calibrated to, for example, provide optimized performance of programming operations. As a result, the host system 110 programs the backup data stored in the volatile memory 116 within the optimized region. The programming operations are performed before the capacitor 130 discharges to the point where it can no longer maintain the necessary power level.

Although described primarily in the context of a storage subsystem that includes a non-volatile memory storage array arranged into segments or zones, the invention is not so limited. For example, in some embodiments, the storage subsystem's memory array may comprise volatile memory elements, and/or may be arranged in units other than zones. In addition, as mentioned above, the solid-state non-volatile memory elements can be replaced or supplemented with magnetic disk drives or another type of storage device.

While certain embodiments of the invention have been described, these embodiments have been presented by way of example only, and are not intended to limit the scope of the invention. Indeed, the novel methods and systems described herein may be embodied in a variety of other forms. Furthermore, various omissions, substitutions and changes in the form of the methods and systems described herein may be made without departing from the spirit of the invention. The invention is defined by the accompanying claims.

What is claimed is:

1. In a storage subsystem that processes storage access commands received from a host system, a method of optimizing execution of storage access commands, the method comprising:
   receiving a calibration request from the host system, the request specifying a first write command and an optimization criterion;
   determining a speed of execution of the first write command, the determining comprising:
      using power provided by a primary power source, executing the first write command, and
      recording the execution speed of the first write command for each of a plurality of regions of a non-volatile memory storage device;
   selecting a region from the plurality of regions having a recorded execution speed that satisfies the optimization criterion; and
   when there is a failure of the primary power source, executing, using power provided by a reserve power source, a second write command directed to the selected region, wherein overhead operations that are directed to the selected region are disabled until the second write command has finished executing, the overhead operations comprising block erase, wear leveling, and bad block management operations.

2. The method of claim 1, wherein the selecting comprises selecting a region having the fastest recorded execution speed.

3. The method of claim 1, further comprising executing one or more block erase operations directed to the selected region prior to executing the second write command so that no block erase operations are performed that are directed to the selected region during the execution of the second write command.

4. The method of claim 1, further comprising executing one or more wear leveling operations directed to the selected region prior to executing the second write command so that no wear leveling operations are performed that are directed to the selected region during the execution of the second write command.

5. The method of claim 1, further comprising disabling execution of one or more wear leveling operations directed to the selected region so that no wear leveling operations are performed that are directed to the selected region during the execution of the second write command, wherein the one or more wear leveling operations comprise distributing write operations across memory locations of the selected region.

6. The method of claim 1, further comprising executing one or more bad block management operations directed to the selected region prior to executing the second write command so that no bad block management operations are performed that are directed to the selected region during the execution of the second write command.

7. The method of claim 1, further comprising:
   executing one or more block erase operations directed to the selected region prior to executing the second write command; and
   executing one or more wear leveling operations directed to the selected region prior to executing the second write command so that no block erase and wear leveling operations are performed that are directed to the selected region during the execution of the second write command.

8. The method of claim 1, further comprising:
executing one or more block erase operations directed to the selected region prior to executing the second write command; and
disabling execution of one or more wear leveling operations directed to the selected region so that no block erase and wear leveling operations are performed that are directed to the selected region during the execution of the second write command, wherein the one or more wear leveling operations comprise distributing write operations across memory locations of the selected region.

9. The method of claim 1, wherein the region comprises a contiguous region.

10. A method of optimizing execution of storage access commands communicated by a host system to a storage subsystem having a non-volatile memory storage device comprising a plurality of regions, the method comprising:
communicating a calibration request to the storage subsystem, the request specifying a first write command and an optimization criterion and causing the storage subsystem to perform calibration of the non-volatile memory storage device using power provided by a primary power source;
in response to the calibration request, receiving an identification of a region of the plurality of regions within the non-volatile memory storage device, the region having a speed of execution of the first write command that satisfies the optimization criterion;
communicating a second write command to the storage subsystem using power provided by a reserve power source, the command comprising the identification of the region embedded as a pattern within the second write command; and
causing execution of the second write command directed to the region in response to detecting a condition requiring the second write command to be executed in a time-critical manner, wherein the execution is performed using power provided by the reserve power source and wherein overhead operations that are directed to the region are disabled until the second write command has finished executing, the overhead operations comprising block erase, wear leveling, and bad block management operations.

11. The method of claim 10, wherein the identification comprises a memory address within the region.

12. The method of claim 10, further comprising mapping the region to a logical drive on the host system, wherein the second write command is directed to the mapped logical drive.

13. The method of claim 10, further comprising mapping the region to a file on the host system, wherein the second write command is directed to the mapped file.

14. The method of claim 10, further comprising:
in response to communicating the calibration request, receiving an execution time of the first write command; and
performing one or more time-critical tasks based at least in part on the execution time, wherein the one or more time-critical tasks comprise backing up data, caching data, and programming data.

15. The method of claim 10, wherein communicating the calibration request comprises:
causing execution of the first write command directed to the plurality of regions of the non-volatile memory storage device;
receiving execution speed of the first write command for each of the plurality of regions; and
selecting a region from the plurality of regions having an execution speed that satisfies the optimization criterion.

16. A storage subsystem comprising:
a non-volatile memory storage device; and
a controller that accesses the non-volatile memory storage device in response to storage access commands received from a host system, the controller configured to:
receive a calibration request from the host system, the request specifying a first write command and an optimization criterion;
in response to receiving the calibration request, and using power from a primary power source:
execute the first write command directed to a plurality of regions of the non-volatile memory storage device, record an execution speed of the first write command for each of the plurality of regions, and select a region from the plurality of regions having the recorded execution speed that satisfies the optimization criterion;
receive a second write command; and
execute, using power from a reserve power source, the second write command directed to the selected region in response to detecting a condition requiring the second write command to be executed in a time-critical manner, wherein overhead operations that are directed to the selected region are disabled until the second write command has finished executing, the overhead operations comprising block erase, wear leveling, and bad block management operations.

17. The storage subsystem of claim 16, wherein the non-volatile storage device comprises a solid-state storage device.

18. The storage subsystem of claim 16, wherein the controller selects the region having the fastest recorded execution speed.

19. The storage subsystem of claim 16, wherein the controller is further configured to execute one or more block erase operations directed to the selected region prior to executing the second write command so that no block erase operations are performed that are directed to the selected region during the execution of the second write command.

20. The storage subsystem of claim 16, wherein the controller is further configured to execute one or more wear leveling operations directed to the selected region prior to executing the second write command so that no wear leveling operations are performed that are directed to the selected region during the execution of the second write command.

21. The storage subsystem of claim 16, wherein the controller is further configured to disable execution of one or more wear leveling operations directed to the selected region so that no wear leveling operations are performed that are directed to the selected region during the execution of the second write command, wherein the one or more wear leveling operations comprise distributing write operations across memory locations of the selected region.

22. The storage subsystem of claim 16, wherein the controller is further configured to execute one or more bad block management operations directed to the selected region prior to the execution of the second write command so that no bad block management operations are performed that are directed to the selected region during the execution of the second write command.

23. The storage subsystem of claim 16, wherein the controller is further configured to:
- execute one or more block erase operations directed to the selected region prior to the execution of the second write command; and
- execute one or more wear leveling operations that are directed to the selected region prior to the execution of the second write command so that no block erase and wear leveling operations are performed in the selected region during the execution of the second write command.

24. The storage subsystem of claim 16, wherein the controller is further configured to:
- execute one or more block erase operations directed to the selected region prior to the execution of the second write command; and
- disable execution of one or more wear leveling operations directed to the selected region so that no block erase and wear leveling operations are performed that are directed to the selected region during the execution of the second write command, wherein the one or more wear leveling operations comprise distributing write operations across memory locations of the selected region.

\* \* \* \* \*